H. HEIKKA.
SELF FEEDER FOR THRESHING MACHINES.
APPLICATION FILED NOV. 5, 1908.
926,117.
Patented June 29, 1909.
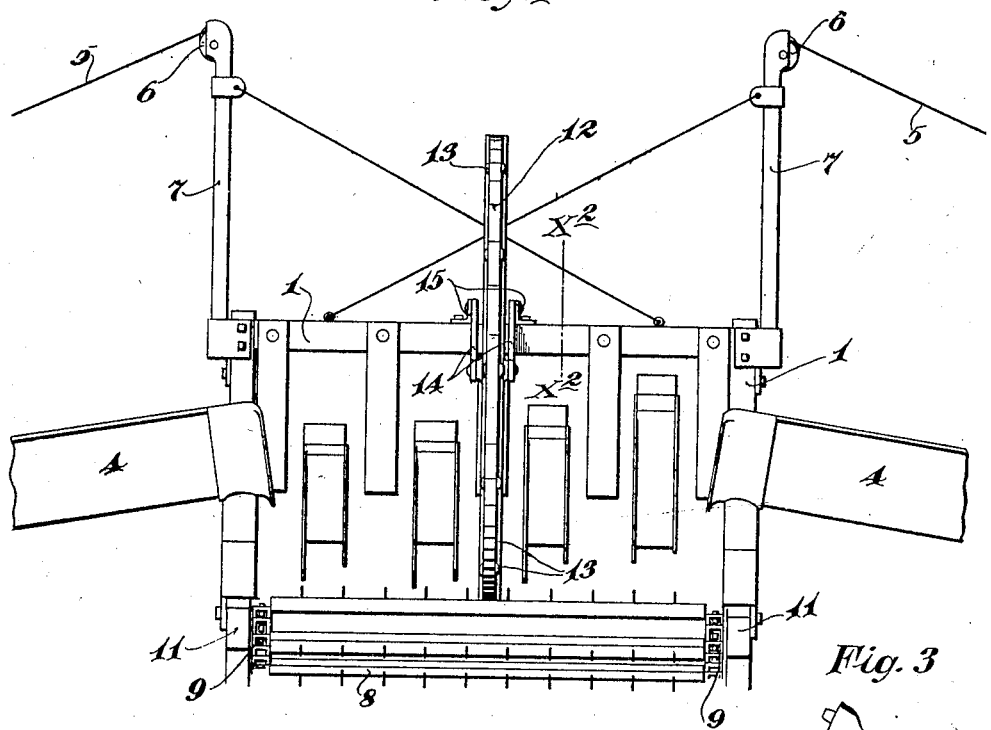
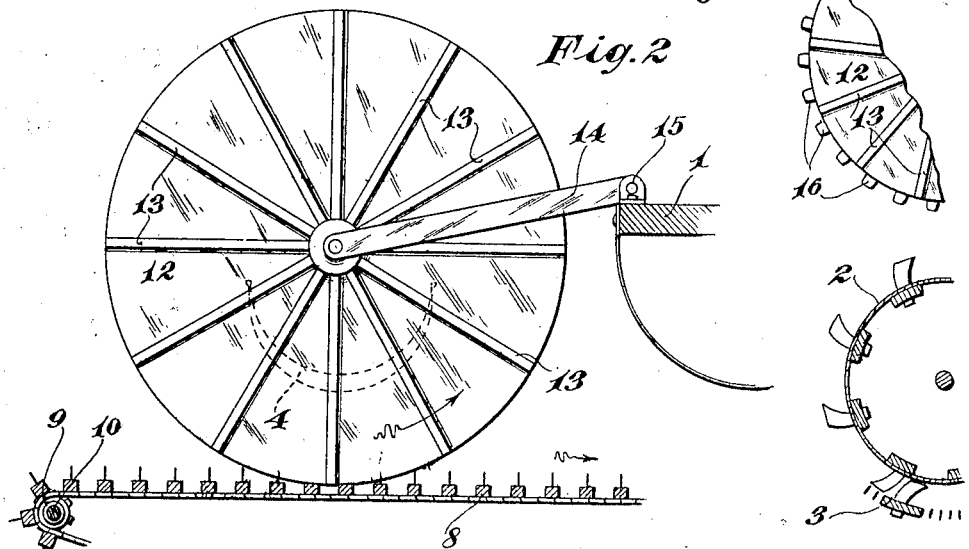
Witnesses:
L. L. Simpson
A. H. Opsahl.
Inventor:
Henry Heikka
By his Attorneys:
Williamson Merchant

UNITED STATES PATENT OFFICE.

HENRY HEIKKA, OF FRANKLIN, MINNESOTA.

SELF-FEEDER FOR THRESHING-MACHINES.

No. 926,117.      Specification of Letters Patent.      Patented June 29, 1909.

Application filed November 5, 1908. Serial No. 461,113.

*To all whom it may concern:*

Be it known that I, HENRY HEIKKA, a citizen of the United States, residing at Franklin, in the county of Renville and State of Minnesota, have invented certain new and useful Improvements in Self-Feeders for Threshing-Machines; and I do hereby declare the following to be a full, clear, and exact description of the invention, such as will enable others skilled in the art to which it appertains to make and use the same.

My invention relates to bundle feeding attachments for threshing machines, and has for its object to provide a simple and efficient device for turning the bundles so that they will be fed endwise to the threshing cylinder and concave.

To the above end, the invention consists of the novel devices and combinations of devices hereinafter described and defined in the claims.

In the accompanying drawings which illustrate the invention, like characters indicate like parts throughout the several views.

Referring to the drawings: Figure 1 is a view in elevation looking at the outer end of the bundle feeding attachment, and showing my invention applied thereto; Fig. 2 is a section taken approximately on the line $x^2$ $x^2$ of Fig. 1, some parts being broken away; and Fig. 3 is a detail illustrating a slightly modified form of the bundle turning wheel, which constitutes the principal feature of my invention.

Of the parts of the threshing machine, the numeral 1 indicates the casing and framework, and the numerals 2 and 3 indicate in diagram, the threshing cylinder and concave respectively.

Of the parts of the bundle feeding attachment proper, the numeral 4 indicates the bundle conveyers that extend in opposite directions from the sides of the receiving end of the threshing machine. These conveyers 4 are of the usual or any suitable construction, and are supported in the customary way by means shown only in part, and which means includes cables 5, and that run over guide sheaves 6 supported by posts 7 rigidly secured to the sides of the machine case 1.

The numeral 8 indicates the power driven endless slat-and-belt conveyer that constitutes a traveling apron, that receives the bundles from the conveyers 4 and delivers the same to the threshing cylinder and concave. The outer portion of the link belts or sprocket chains of this conveyer 8, as shown, runs over sprockets 9 on a shaft 10 mounted in projections 11 of the frame 1. The inner portion of this conveyer 8 runs over a power driven sprocket, not shown, but which may be supported and driven in the customary way.

The bundles will usually be delivered endwise from the transversely extended conveyers 4, and will fall onto the conveyer 8 approximately parallel to the axis of the threshing cylinder 2. It is important, to a proper threshing action, that the bundles be delivered endwise to the threshing cylinder and concave. This I accomplish by the provision of a so-called bundle turning wheel 12, which is preferably in the form of a disk that is provided on both sides with radial ribs or cleats 13, and is located over the conveyer 8, midway between the delivery ends of the two conveyers 4, with its axis parallel to the axis of the threshing cylinder. In the preferred arrangement of this bundle turning device, the wheel 12 is journaled to the free ends of a pair of parallel arms 14, the outer ends of which are pivotally connected to bearings 15 on the top plate of the machine case 1. With this construction, the wheel 12 is gravity held directly upon the slats of the conveyer 8, so that it will be rotated in the direction of the arrow marked thereon, when a bundle feeding movement is imparted to the said conveyer 8. In Fig. 3, the wheel 12 is shown as provided with peripheral teeth or projections 16, that are adapted to engage between the slats of the conveyer 8 so that the wheel 12 will be more positively driven by the said conveyer. When the bundles are delivered onto the conveyer 8, their inner ends will be thrown against the ribbed faces of the wheel 12, and under rotation of the said wheel, the inner ends of the said bundles will be turned toward the threshing cylinder. The construction as shown, however, is extremely simple and in practice has been found efficient for the purposes had in view.

What I claim is:

1. The combination with a threshing cylinder and concave for threshing machines, of a traveling apron for delivering bundles to said threshing cylinder and concave, oppositely extended conveyers for delivering the bundles onto said traveling apron, a bundle turning wheel with radial cleats, and means supporting said wheel in a vertical position upon the intermediate portion of said traveling apron, said wheel being rotative in a direction to turn the inner ends of the bundles toward the threshing cylinder, substantially as described.

2. In a bundle feeding device for threshing machines, the combination with an endless traveling apron, of a bundle turning wheel, and means supporting said wheel in a vertical position upon said traveling apron and arranged to be driven by said apron, substantially as described.

3. In a bundle feeding device for threshing machines, the combination with an endless slat and belt conveyer, of a ribbed bundle turning wheel, and means supporting said wheel in a vertical position upon said conveyer, said wheel having peripheral teeth or projections engageable with the slats of said conveyer and insuring positive rotation of said wheel, substantially as described.

4. The combination with a threshing machine, of a bundle feeding device therefor comprising an endless traveling apron for delivering the bundles to the cylinder and concave of said threshing machine, an arm pivotally connected to the machine case and a ribbed bundle turning wheel journaled to said arm and normally resting on the top of said traveling apron, substantially as described.

In testimony whereof I affix my signature in presence of two witnesses.

HENRY HEIKKA.

Witnesses:
  H. B. COLE,
  C. E. FREEMAN.